A. W. MANNING.
Gas-Heaters for Cooking Oysters.

No. 154,609. Patented Sept. 1, 1874.

Witnesses.
E. McQuesten,
Chs. H. Whitman

Inventor.
A. W. Manning
By C. Wm. Smith
Atty.

UNITED STATES PATENT OFFICE.

ALFRED W. MANNING, OF SAN FRANCISCO, CALIFORNIA.

IMPROVEMENT IN GAS-HEATERS FOR COOKING OYSTERS.

Specification forming part of Letters Patent No. 154,609, dated September 1, 1874; application filed February 10, 1874.

*To all whom it may concern:*

Be it known that I, ALFRED WASHINGTON MANNING, of the city and county of San Francisco, State of California, have invented an Improved Device for Roasting or Broiling Oysters over Gas; and I do hereby declare that the following is a full, clear, and exact description of the same, reference being had to the accompanying drawings and to the letters marked thereon.

My invention relates to a novel device for roasting oysters, either within the shell upon a proper gridiron or support, or after they have been removed from the shell; and it consists in the use of a peculiarly-constructed funnel-shaped heater, which may be placed over the source of heat, which will ordinarily be a gas-burner. Within this funnel is a smaller tube, within which the flame burns, and is spread out by a wire-gauze at the top. Above the gauze is placed a small pan to catch the liquor and save it, while the shell or other receptacle for the oyster is placed over the top of the converging upper cone, where it will receive the full effect of the heat.

Figure 1:
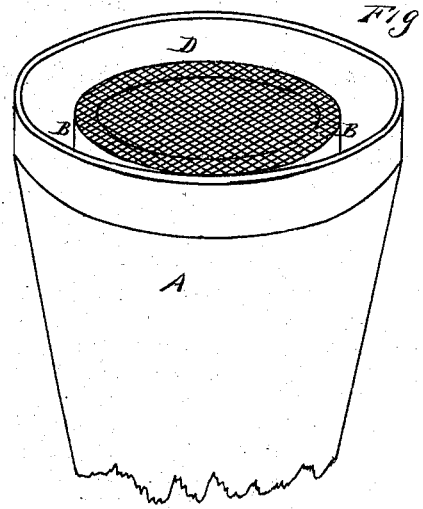
Figure 2:
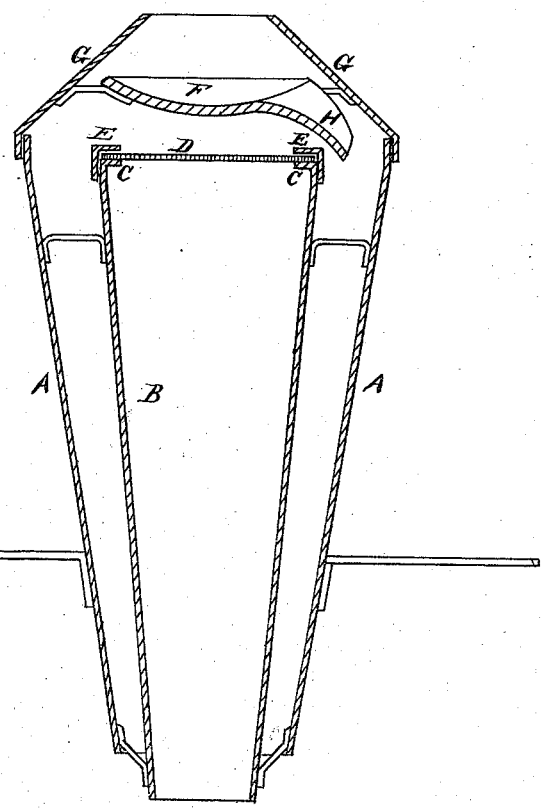

Referring to the accompanying drawings, Figure 1 represents a partial perspective view of my device with upper part removed. Fig. 2 is a vertical section in elevation of my device.

A is the lower part of my device, which is made conical, being larger at the top than at the bottom, and this cone is so constructed as to be secured conveniently above the burner or source of heat. Within this cone is secured another cylindrical cone, B, somewhat smaller than the cone A, and through this the gas passes, while a passage is left around the outside of this inner tube, for purposes hereinafter described. The top of the tube B has a flange, C, turned inward, and upon this circular flange the wire-gauze distributer D is placed, as shown, being kept in place by the flanged ring E, which fits over it, and provides for the expansion of the wire-gauze and the concentration of the heat of the flame. The gas is ignited above the distributer D, and serves to heat the shallow cup F, which is placed just above it, and the heat also passes around this cup to escape above. The cup F is supported within the upper part G of my device, which consists of a shorter cone, fitting upon the top of the cone A, as shown, and the oyster may be placed upon a gridiron and over the small upper opening of this cone, and the oyster is thus roasted. It should here be observed that the cup F also protects the wire-gauze by preventing the liquor from falling upon it. The juice and drippings from the cooking oyster are received within the shallow pan F, before described, and a spout, H, leads over, so that all this rich juice is carried down outside the tube B and within the tube A, so that it can be caught below and will serve to baste the oyster when it is served up.

This device is only intended to cook one oyster; consequently a series of them must be employed over separate jets of gas, to cook as many as may be ordered at any one time.

By this construction and arrangement of the double cone and conical cap, the carbon contained in the gas is wholly consumed, and the heat intensified, making it possible to cook the edible with coal-gas without the depositing of soot or unconsumed carbon; and by this device and process, also, I am enabled to cook an oyster in a style of richness not otherwise equaled, and to give it a most superior flavor.

Having thus described my invention, what I claim, and desire to secure by Letters Patent, is—

The cover G, supporting the cup F, which is provided with the spout H, the cover being adapted to overhang the cup F, for the purpose of concentrating the heat on the substance contained therein, as described.

In witness whereof I have hereunto set my hand and seal.

ALFRED W. MANNING. [L. S.]

Witnesses:
C. W. M. SMITH,
S. P. WHITMAN.